United States Patent
Lee

(10) Patent No.: US 9,625,911 B2
(45) Date of Patent: Apr. 18, 2017

(54) SYSTEM AND METHOD FOR AVOIDING OBSTACLE FOR AUTONOMOUS VEHICLE

(71) Applicant: HYUNDAI MOBIS Co., Ltd., Yongin-si, Gyeonggi-do (KR)

(72) Inventor: Jeong Hee Lee, Uiwang-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/939,443

(22) Filed: Nov. 12, 2015

(65) Prior Publication Data
US 2016/0132058 A1    May 12, 2016

(30) Foreign Application Priority Data
Nov. 12, 2014  (KR) .................. 10-2014-0156954

(51) Int. Cl.
| G05D 1/02 | (2006.01) |
| G01S 13/93 | (2006.01) |
| B62D 15/02 | (2006.01) |
| G01S 13/86 | (2006.01) |

(52) U.S. Cl.
CPC ....... G05D 1/0214 (2013.01); B62D 15/0265 (2013.01); G01S 13/931 (2013.01); G01S 13/867 (2013.01); G01S 2013/9353 (2013.01); G01S 2013/9375 (2013.01); G05D 2201/0213 (2013.01)

(58) Field of Classification Search
CPC ... G05D 1/0214; G05D 1/0238; G01S 13/931
USPC ............................................. 701/24, 25, 26
See application file for complete search history.

(56) References Cited

U.S. PATENT DOCUMENTS

| 4,821,192 A * | 4/1989 | Taivalkoski | B25J 9/0003 700/258 |
| 8,849,494 B1 * | 9/2014 | Herbach | B60W 30/00 701/24 |
| 2016/0014426 A1 * | 1/2016 | Richert | H04N 19/51 375/240.16 |
| 2016/0018822 A1 * | 1/2016 | Nevdahs | G05D 1/0094 701/26 |
| 2016/0091899 A1 * | 3/2016 | Aldred | G05D 1/0225 701/23 |
| 2016/0132058 A1 * | 5/2016 | Lee | G05D 1/0214 701/26 |

* cited by examiner

Primary Examiner — Thomas G Black
Assistant Examiner — Wae Louie
(74) Attorney, Agent, or Firm — Paratus Law Group, PLLC

(57) ABSTRACT

A system and method of avoiding an obstacle for an autonomous vehicle is provided. The system includes an valid trajectory generation unit configured to generate a circle in which the vehicle is located in a center position of a circle, calculate a rotatable range of the vehicle, and generate an valid trajectory estimated that the vehicle passes based on the generated circle and rotatable range; an obstacle detection unit configured to detect the obstacle located in front of the vehicle; and a driving path control unit configured to control a driving path of the vehicle when a position of the detected obstacle is included within the generated valid trajectory.

12 Claims, 5 Drawing Sheets

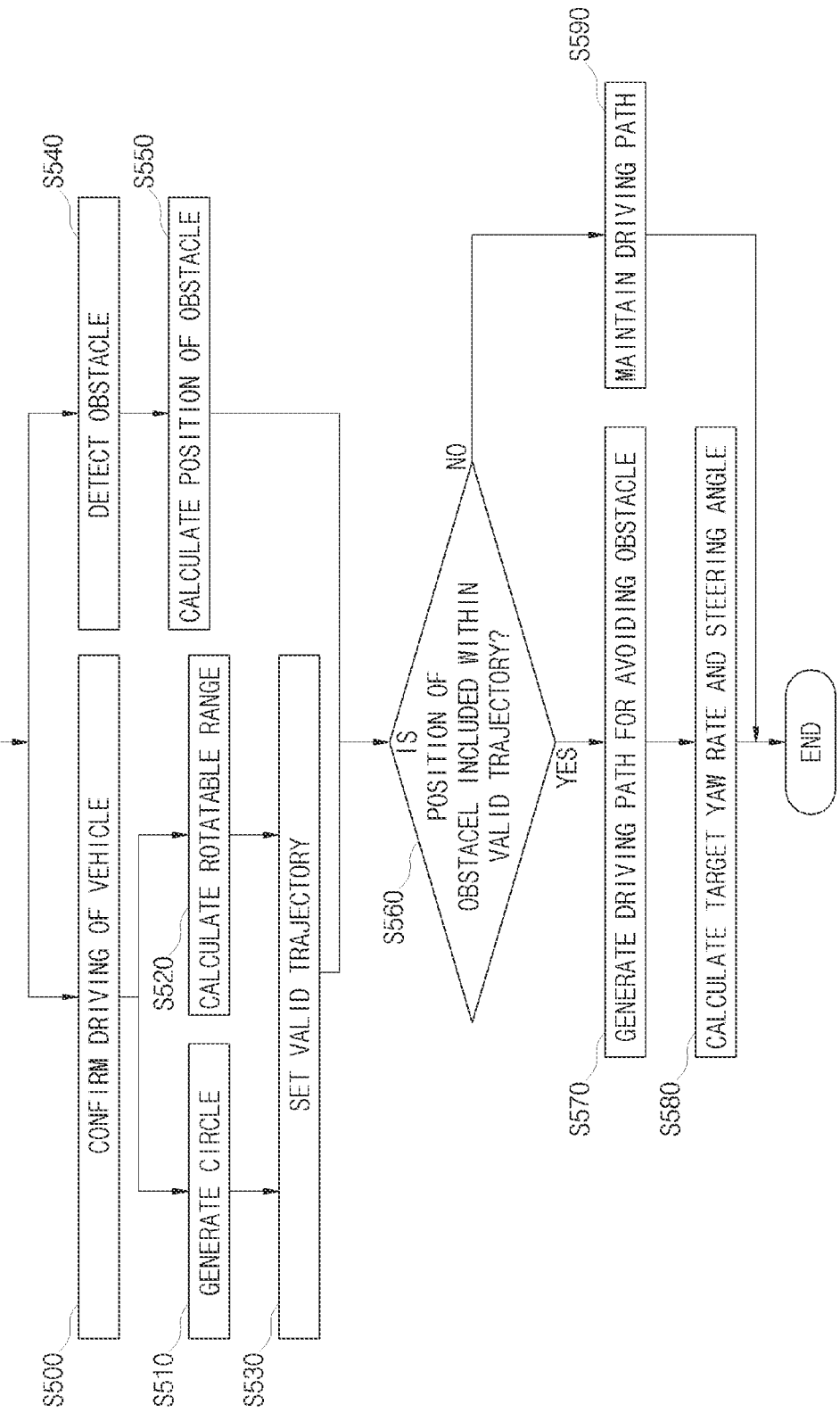

SYSTEM AND METHOD FOR AVOIDING OBSTACLE FOR AUTONOMOUS VEHICLE

CROSS-REFERENCE TO RELATED APPLICATION

This application claims priority to and the benefit of Korean Patent Application No. 10-2014-0156954, filed on Nov. 12, 2014, the disclosure of which is incorporated herein by reference in its entirety.

BACKGROUND

1. Field of the Invention

The present invention relates to a system and method for avoiding an obstacle for an autonomous vehicle, and more particularly, to a system and method for avoiding an obstacle for an autonomous vehicle which detects the obstacle located in a driving path of the autonomous vehicle, sets the driving path capable of avoiding the detected obstacle, and controls the driving of the autonomous vehicle according to the set driving path.

2. Discussion of Related Art

An autonomous vehicle detects an obstacle using a distance sensor, and is driven while avoiding the detected obstacle by a steering and speed control.

Generally, a method of generating a plurality of paths for a space in which the autonomous vehicle can be driven, determining whether there is the obstacle in the generated path using a cost function, and avoiding the obstacle by selecting an optimum driving path according to the determined result is used.

As a conventional method of avoiding the obstacle for the autonomous vehicle, there are a method and apparatus for avoiding a collision using a steering control (Korea Patent No. 10-1073259, hereinafter, it is referred to as "prior art 1"), and a method and apparatus for calculating a vehicle path and a method and apparatus for controlling steering of a vehicle (Korean Patent Publication No. 10-2014-0043038, hereinafter, it is referred to as "prior art 2"), etc.

First, prior art 1 determines a collision risk with an obstacle by calculating a distance and a relative speed with the obstacle when a forward obstacle is detected while driving.

When there is the collision risk with the obstacle based on the determined result, prior art 1 relates to technology controlling the steering of the vehicle by calculating a yaw rate and a compensation steering angle needed for avoiding the collision.

Second, prior art 2 determines a target position for avoiding the obstacle or changing a vehicle path based on a current position of the vehicle.

Prior art 2 relates to technology for calculating a parameter using a steering angle control pattern model extracted from driving activity data based on the determined target position, and calculating a changed spatial or temporal vehicle path.

However, prior art 1 is a method of generating a geometric avoidance circle trajectory and a yaw rate to control the steering of the vehicle, and has a problem in which a time for determining an unnecessary circle trajectory is consumed since the circle trajectory not capable of driving can be generated according to a driving condition of the autonomous vehicle.

Further, prior art 2 has a problem in which a calculation load is increased since an amount of calculations is increased when the vehicle is driven while generating a clothoid curve in real-time using the clothoid curve as a driving trajectory of the autonomous vehicle.

SUMMARY OF THE INVENTION

The present invention is directed to a system and method for avoiding an obstacle for an autonomous vehicle which generates an valid trajectory which is estimated that the autonomous vehicle passes based on a circle according to a speed of the autonomous vehicle and a rotatable range according to a steering angle, lateral acceleration and a yaw rate, and controls a path of the autonomous vehicle according to whether there is the obstacle within the generated valid trajectory.

According to one aspect of the present invention, there is provided a system for avoiding an obstacle for an autonomous vehicle, including: an valid trajectory generation unit configured to generate a circle in which the vehicle is located in a center position of a circle, calculate a rotatable range of the vehicle, and generate an valid trajectory estimated that the vehicle passes based on the generated circle and rotatable range; an obstacle detection unit configured to detect the obstacle located in front of the vehicle; and a driving path control unit configured to control a driving path of the vehicle when a position of the detected obstacle is included within the generated valid trajectory.

The valid trajectory generation unit may include a circle generator configured to generate the circle in which the vehicle is located in the center position of the circle and a radius of the circle is in proportion to a speed of the vehicle.

The valid trajectory generation unit may include a rotatable range calculator configured to calculate the rotatable range of the vehicle based on a steering angle, a lateral acceleration, and a yaw rate of the vehicle.

The driving path control unit may set a target position within the valid trajectory in which the vehicle is able to avoid the obstacle, and control the driving path of the vehicle based on the set target position.

The driving path control unit may calculate a target yaw rate and a steering angle in order to track the controlled driving path and control an autonomous driving of the vehicle.

The obstacle detection unit may measure a distance to the detected obstacle, calculate the position of the detected obstacle using the measured distance and a current position of the vehicle, and provide the calculated position to the driving path control unit.

According to another aspect of the present invention, there is provided a method of avoiding an obstacle for an autonomous vehicle, including: generating a circle in which the vehicle is located in a center position of a circle, and calculating a rotatable range of the vehicle; generating an valid trajectory estimated that the vehicle passes based on the generated circle and rotatable range; and detecting the obstacle located in front of the vehicle, and controlling a driving path of the vehicle when a position of the detected obstacle is included within the generated valid trajectory.

The generating of the circle may generate the circle in which the vehicle is located in the center position of the circle and a radius of the circle is in proportion to a speed of the vehicle.

The generating of the valid trajectory may generate the valid trajectory using a steering angle, a lateral acceleration, and a yaw rate of the vehicle.

The controlling of the driving path may set a target position within the valid trajectory in which the vehicle is able to avoid the obstacle, and control the driving path of the vehicle according to the set target position.

The controlling of the driving path may include calculating a target yaw rate and a steering angle in order to track the controlled driving path.

The controlling of the driving path may include: measuring a distance to the detected obstacle; and calculating the position of the detected obstacle using the measured distance and a current position of the vehicle.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 5 is a flowchart for describing a method of avoiding an obstacle for an autonomous vehicle according to an embodiment of the present invention.

DETAILED DESCRIPTION OF EXEMPLARY EMBODIMENTS

The above and other objects, features, and advantages of the present invention will become more apparent to those of ordinary skill in the art by describing in detail exemplary embodiments thereof with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims.

Meanwhile, the terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Hereinafter, exemplary embodiments of the present invention will be described in detail with reference to the accompanying drawings.

Figure 1:
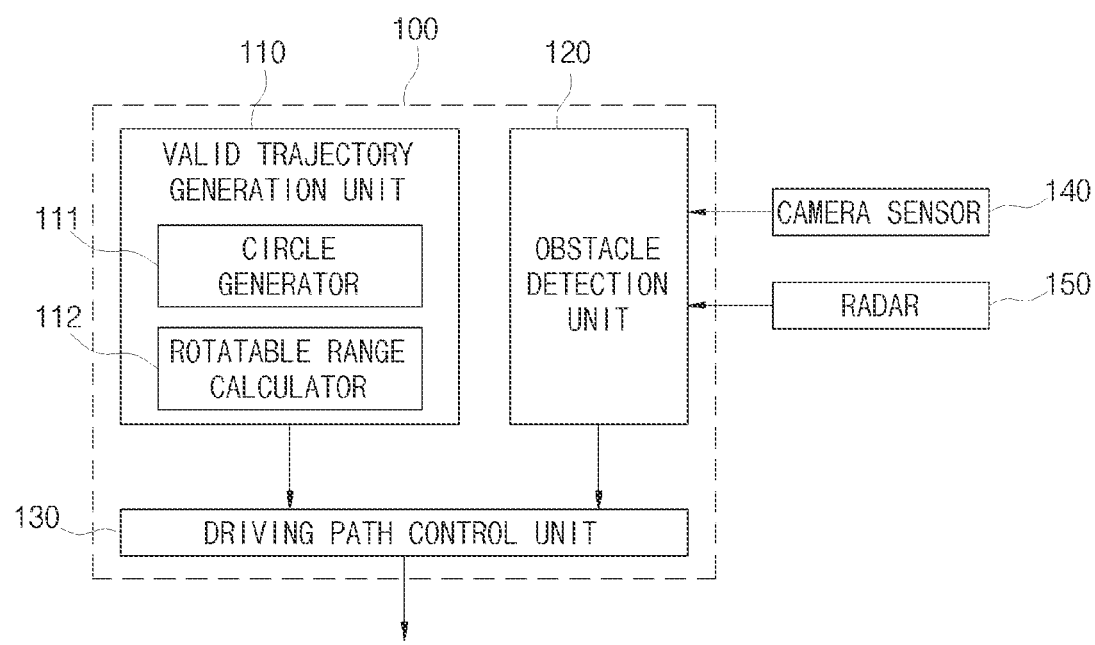
FIG. 1 is a block diagram illustrating a system for avoiding an obstacle for an autonomous vehicle according to an embodiment of the present invention.

FIG. 1 is a block diagram illustrating a system 100 for avoiding an obstacle for an autonomous vehicle according to an embodiment of the present invention.

As shown in FIG. 1, the system 100 for avoiding an obstacle for an autonomous vehicle may include an valid trajectory generation unit 110, an obstacle detection unit 120, and a driving path control unit 130.

The valid trajectory generation unit 110 may include a circle generator 111 and a rotatable range calculator 112, generate an valid trajectory estimated that an autonomous vehicle passes according to a driving condition of the autonomous vehicle, and provide the generated valid trajectory to the driving path control unit 130.

The circle path generator 111 of the valid trajectory generation unit 110 may obtain speed information of the autonomous vehicle from a speed sensor, and generate a circle having a radius of a circle changed according to the obtained speed of the autonomous vehicle. Here, the circle path may mean a circle in which the autonomous vehicle is located in a center point, and include positions estimated that the autonomous vehicle passes while driving.

The circle path generator 111 may set the radius of the circle for the circle in proportion to the speed of the autonomous vehicle. Since the radius of the circle for the circle path cannot be set to be small or great infinitely, a lower limit and an upper limit of each of the speed of the autonomous vehicle and the radius may be set, and the radius may be constantly maintained when the speed of the autonomous vehicle is not between the set lower limit and the set upper limit.

Figure 2:
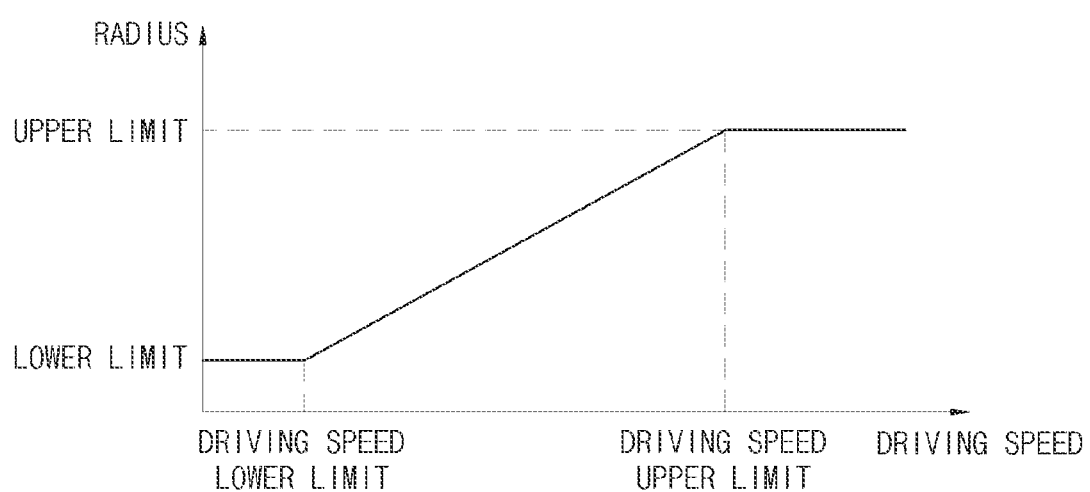
FIGS. 2 to 4 are diagrams for describing an operation of controlling a driving path of an autonomous vehicle through the system for avoiding an obstacle for an autonomous vehicle according to an embodiment of the present invention.

FIG. 2 is a diagram illustrating an example in which the circle generator 111 sets the radius of the circle for the circle path according to the speed of the autonomous vehicle.

When the speed of the autonomous vehicle is equal to or less than the set lower limit, the radius of the circle for the circle may be maintained as the set lower limit, and when the speed of the autonomous vehicle is between the lower limit and the upper limit, the radius of the circle for the circle may be constantly increased according to the speed of the autonomous vehicle.

Meanwhile, when the speed of the autonomous vehicle is equal to or more than the set upper limit, the radius of the circle for the circle may be maintained as the set upper limit.

The circle generated in the circle generator 111 may be generated based on the autonomous vehicle located in the center point, and may be used for allowing the autonomous vehicle to avoid the obstacle by providing the circle having the radius of the circle changed according to the speed of the autonomous vehicle.

However, in this case, when performing the avoidance control of the obstacle for the autonomous vehicle using only the circle, there may be a disadvantage in which an amount of unnecessary calculations is increased since the obstacle detection operation is performed even on a position estimated that the autonomous vehicle does not actually pass.

In order to solve the problem, the range in which the autonomous vehicle is rotatable may be calculated in the rotatable range calculator 112 of the valid trajectory generation unit 110, and the avoidance control of the obstacle for the autonomous vehicle may be performed using the valid trajectory based on the calculated rotatable range and the circle generated by the circle generator 111.

In detail, the rotatable range calculator 112 may calculate the range in which the autonomous vehicle is rotatable in a current driving condition by the steering angle, the lateral acceleration, and the yaw rate of the autonomous vehicle.

The valid trajectory generation unit 110 may set a portion in which the circle generated by the circle generator 111 and the rotatable range calculated by the rotatable range calculator 112 overlap each other as the valid trajectory estimated that the autonomous vehicle passes.

Figure 3:
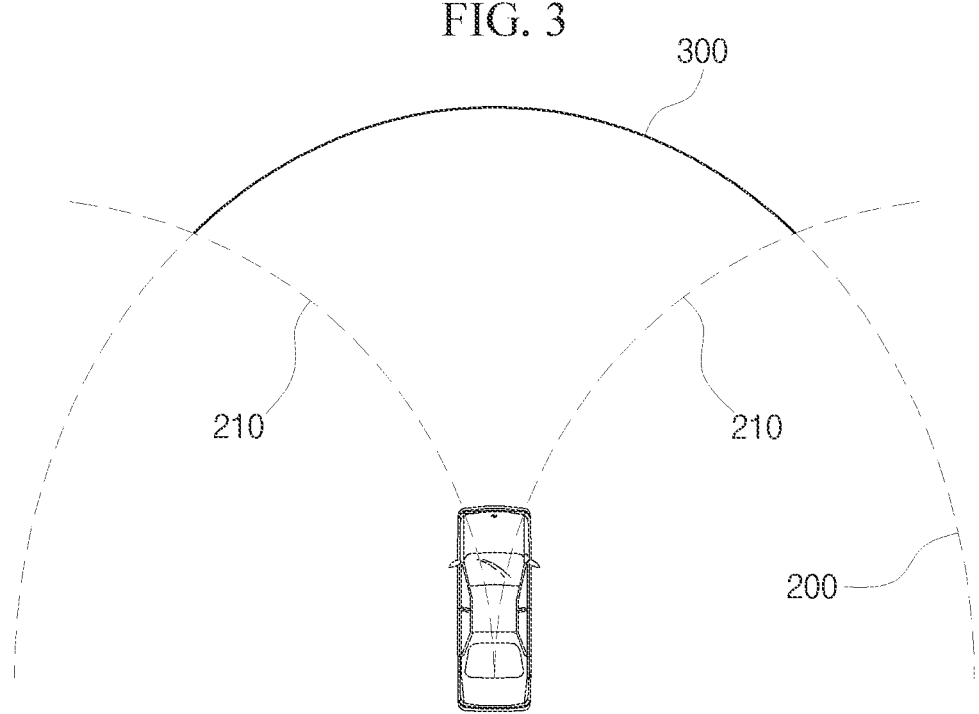

FIG. 3 is a diagram illustrating an example of setting the valid trajectory of the autonomous vehicle in the valid trajectory generation unit 110.

As shown in FIG. 3, a circle 200 (including portions represented by a solid line and a dotted line) may be set according to the speed of the autonomous vehicle in the circle generator 111.

A rotatable range 210 in which the autonomous vehicle is rotatable may be calculated based on the steering angle, the lateral acceleration, and the yaw rate of the autonomous vehicle in the rotatable range calculator 112.

An valid trajectory 300 (a portion represented by a solid line) estimated that the autonomous vehicle passes may be generated according to the circle 200 and the rotatable range 210.

The valid trajectory generation unit 110 may generate the valid trajectory 300 in real time while the autonomous vehicle is driven, and provide information related to the generated valid trajectory 300 to the driving path control unit 130.

The obstacle detection unit 120 may detect the obstacle through a distance sensor installed in the autonomous vehicle. Here, the distance sensor may include a camera sensor 140 and a radar 150.

The obstacle detection unit 120 may measure a distance with the detected obstacle, calculate a position of the obstacle using the measured distance and a current position of the autonomous vehicle, and provide information related to the calculated position of the obstacle to the driving path control unit 130.

The driving path control unit 130 may determine whether to control the driving path of the autonomous vehicle using the valid trajectory 300 provided from the valid trajectory generation unit 110 and the information related to the position of the obstacle provided from the obstacle detection unit 120.

When the position of the obstacle is within the valid trajectory 300 provided from the valid trajectory generation unit 110 based on the position information of the obstacle transmitted from the obstacle detection unit 120, the driving path control unit 130 may set a position capable of avoiding the obstacle among the positions in the valid trajectory 300 as a target position, and control the driving path of the autonomous vehicle so as to pass the set target position.

Figure 4:
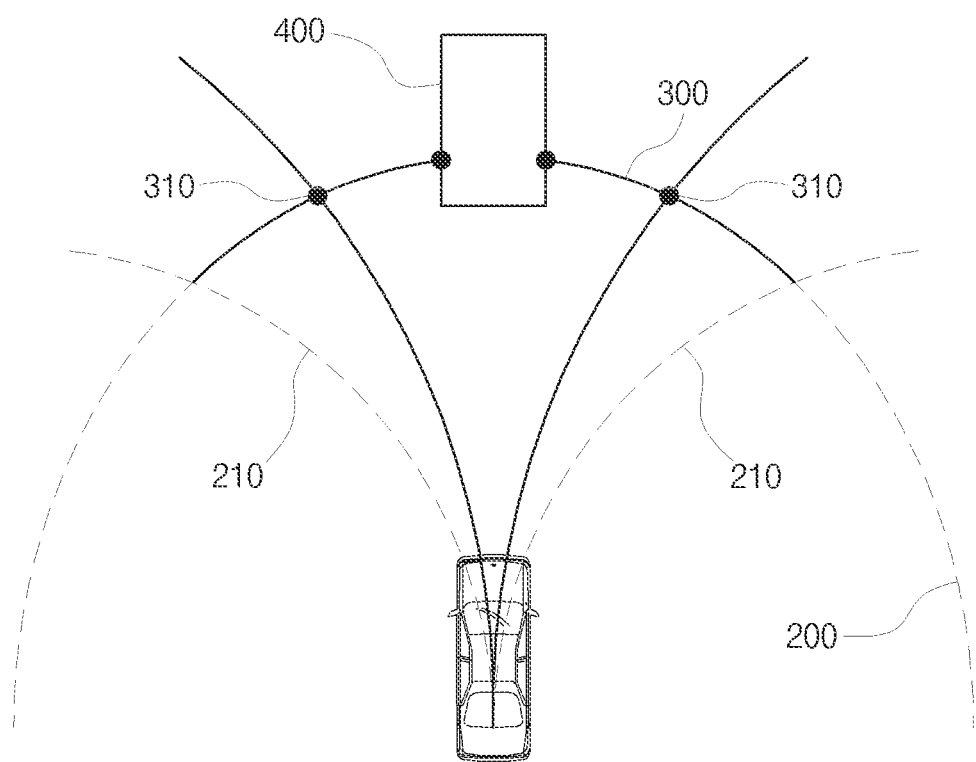

FIG. 4 is a diagram illustrating an example in which the driving path control unit 130 controls the driving path of the autonomous vehicle.

As shown in FIG. 4, when it is determined that an obstacle 400 is located within the valid trajectory 300 generated by the valid trajectory generation unit 110, the driving path control unit 130 may set one among the positions capable of avoiding the obstacle 400 as a target position 310.

For example, an intersection point of the valid trajectory 300 and the obstacle 400 may be obtained by comparing the valid trajectory 300 and the position of the obstacle 400, and a position which is away from the calculated intersection point by a distance corresponding to a size of the autonomous vehicle and is within the valid trajectory 300 may be set as the target position 310.

The driving path of the autonomous vehicle may be controlled so that the autonomous vehicle is driven while passing the set target position 310.

In detail, the autonomous vehicle may be driven while avoiding the obstacle 400 by calculating the target yaw rate and the steering angle for tracking the set target position 310 and controlling the autonomous vehicle according to the calculated yaw rate and steering angle.

Hereinafter, a method of avoiding the obstacle for the autonomous vehicle according to an embodiment of the present invention corresponding to an operation of the system for avoiding the obstacle for the autonomous vehicle according to an embodiment of the present invention will be sequentially described with reference to FIG. 5.

FIG. 5 is a flowchart for describing a method of avoiding an obstacle for an autonomous vehicle according to an embodiment of the present invention.

As shown in FIG. 5, when it is confirmed that the autonomous vehicle is in a driving state (S500), the circle in which the autonomous vehicle is located in a center position of a circle may be generated according to the speed of the autonomous vehicle (S510).

The rotatable range which is a range in which the autonomous vehicle is rotatable may be calculated based on the steering angle, the lateral acceleration, and the yaw rate of the autonomous vehicle when the autonomous vehicle is in the driving state (S520).

Next, a portion in which the circle generated in the operation S510 and the rotatable range calculated in the operation S520 overlap each other may be set as the valid trajectory estimated that the autonomous vehicle passes (S530).

Meanwhile, in the operation S500, the obstacle may be detected through a sensor installed in the autonomous vehicle (S540). Here, the sensor may include a camera sensor and a radar.

The position of the obstacle may be calculated based on the distance between the autonomous vehicle and the detected obstacle, and the current position of the autonomous vehicle (S550). At this time, the obstacle located in front of the autonomous vehicle may be detected regardless of the operation of setting the valid trajectory in the operation S530, but the valid trajectory may be set and only the obstacle which is within the set valid trajectory may be detected when it is confirmed that the autonomous vehicle is in the driving state.

The valid trajectory may be set in the operation S530, and it may be confirmed whether the position of the obstacle is included within the set valid trajectory when the position of the obstacle is calculated in the operation S550 (S560).

When the position of the obstacle is not included within the set valid trajectory based on the confirmed result, the driving of the autonomous vehicle may be controlled while maintaining the current driving path (S590).

On the other hand, when the position of the obstacle is included within the set valid trajectory based on the result confirmed in the operation S560, the driving path capable of avoiding the detected obstacle may be generated (S570). For example, a position which is away from the position of the detected obstacle by a distance corresponding to a size of the autonomous vehicle may be set as the target position, and the driving path capable of passing the set target position may be generated.

When the driving path is generated, the target yaw rate and the steering angle for tracking the generated driving path may be calculated (S580), and the driving of the autonomous vehicle may be controlled according to the calculated target yaw rate and steering angle.

Accordingly, the amount of calculations can be reduced compared with the conventional method by using the effective trajectory changed according to the speed of the autonomous vehicle, and the autonomous vehicle can avoid the obstacle.

According to the present invention, the amount of calculations can be reduced compared with the conventional method by determining a collision possibility with the obstacle by using the valid trajectory changed according to the speed and the rotatable range of the autonomous vehicle, and the driving path can be generated in real time.

Further, according to the present invention, the present invention can be used in high speed and low speed environments since the target position changed according to the speed of the autonomous vehicle is used.

It will be apparent to those skilled in the art that various modifications can be made to the above-described exemplary embodiments of the present invention without departing from the spirit or scope of the invention. Accordingly, the exemplary embodiments of the present invention is for the purpose of describing particular embodiments only and is not intended to be limiting of the invention, and the scope of the present invention is not limited by the exemplary embodiments of the present invention. The scope of the present invention should be defined by the claims, and it is intended that the present invention covers all such modifications provided they come within the scope of the appended claims and their equivalents.

What is claimed is:

1. A system for avoiding an obstacle for an autonomous vehicle, comprising:
    a valid trajectory generation unit configured to:
        generate a circle around the vehicle located at a center of the circle,
        calculate a rotatable range of the vehicle, the rotatable range including a left rotatable curve starting from the vehicle and intersecting the circle and a right rotatable curve starting from the vehicle and intersecting the circle, and
        generate a valid trajectory area defined by a closed area formed by the circle, the left and right rotatable curves, and the vehicle in front of the vehicle;
    an obstacle detection unit configured to detect the obstacle located in front of the vehicle; and
    a driving path control unit configured to control a driving path of the vehicle when a position of the detected obstacle is included within the generated valid trajectory area.

2. The system of avoiding the obstacle for the autonomous vehicle of claim 1, wherein the valid trajectory generation unit includes:
    a circle generator configured to generate the circle having a radius in proportion to a speed of the vehicle.

3. The system of avoiding the obstacle for the autonomous vehicle of claim 1, wherein the valid trajectory generation unit includes:
    a rotatable range calculator configured to calculate the rotatable range of the vehicle based on a steering angle, a lateral acceleration, and a yaw rate of the vehicle.

4. The system of avoiding the obstacle for the autonomous vehicle of claim 1, wherein the driving path control unit sets a target position, within the valid trajectory area, in which the vehicle is able to avoid the obstacle, and controls the driving path of the vehicle based on the set target position.

5. The system of avoiding the obstacle for the autonomous vehicle of claim 4, wherein the driving path control unit calculates a target yaw rate and a steering angle in order to track the controlled driving path and controls an autonomous driving of the vehicle.

6. The system of avoiding the obstacle for the autonomous vehicle of claim 1, wherein the obstacle detection unit measures a distance to the detected obstacle, calculates the position of the detected obstacle using the measured distance and a current position of the vehicle, and provides the calculated position to the driving path control unit.

7. A method of avoiding an obstacle for an autonomous vehicle, comprising:
    generating a circle around the vehicle located at a center of the circle;
    calculating a rotatable range of the vehicle, the rotatable range including a left rotatable curve starting from the vehicle and intersecting the circle and a right rotatable curve starting from the vehicle and intersecting the circle;
    generating a valid trajectory area defined by a closed area formed by the circle, the left and right rotatable curves, and the vehicle in front of the vehicle;
    detecting the obstacle located in front of the vehicle; and
    controlling a driving path of the vehicle when a position of the detected obstacle is included within the generated valid trajectory area.

8. The method of avoiding the obstacle for the autonomous vehicle of claim 7, wherein the generating the circle generates the circle having a radius in proportion to a speed of the vehicle.

9. The method of avoiding the obstacle for the autonomous vehicle of claim 7, wherein the generating the valid trajectory generates the valid trajectory area using a steering angle, a lateral acceleration, and a yaw rate of the vehicle.

10. The method of avoiding the obstacle for the autonomous vehicle of claim 7, wherein the controlling the driving path sets a target position, within the valid trajectory area, in which the vehicle is able to avoid the obstacle, and controls the driving path of the vehicle according to the set target position.

11. The method of avoiding the obstacle for the autonomous vehicle of claim 10, wherein the controlling the driving path includes:
    calculating a target yaw rate and a steering angle in order to track the controlled driving path.

12. The method of avoiding the obstacle for the autonomous vehicle of claim 7, wherein the controlling the driving path includes:
    measuring a distance to the detected obstacle; and
    calculating the position of the detected obstacle using the measured distance and a current position of the vehicle.

* * * * *